United States Patent
Kobayashi et al.

(10) Patent No.: US 8,773,548 B2
(45) Date of Patent: Jul. 8, 2014

(54) IMAGE SELECTION DEVICE AND IMAGE SELECTING METHOD

(75) Inventors: Hiroyuki Kobayashi, Kawasaki (JP); Kimitaka Murashita, Kawasaki (JP); Masayoshi Shimizu, Kawasaki (JP); Takehiro Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 13/493,152

(22) Filed: Jun. 11, 2012

(65) Prior Publication Data
US 2012/0249826 A1    Oct. 4, 2012

Related U.S. Application Data

(63) Continuation of application No. PCT/JP2009/007038, filed on Dec. 18, 2009.

(51) Int. Cl.
 *H04N 5/228* (2006.01)
 *H04N 5/14* (2006.01)

(52) U.S. Cl.
 USPC ........................................ 348/222.1; 348/571

(58) Field of Classification Search
 CPC ............ H04N 5/23254; H04N 5/2353; H04N 3/1587; H04N 5/23219; H04N 5/23229; H04N 5/2354; G06T 7/2006; G06T 2207/20201; G06T 5/003; G06T 2207/10016; G06T 7/20
 USPC ............................................... 348/222.1, 571
 See application file for complete search history.

(56) References Cited

U.S. PATENT DOCUMENTS

| 7,990,429 B2 | 8/2011 | Saito |
| 8,179,466 B2 * | 5/2012 | Border et al. ................. 348/308 |
| 2005/0219666 A1 | 10/2005 | Ejima et al. |
| 2008/0170124 A1 | 7/2008 | Hatanaka et al. |
| 2008/0187234 A1 | 8/2008 | Watanabe et al. |
| 2009/0096897 A1 | 4/2009 | Saito |
| 2011/0032378 A1 | 2/2011 | Kaneda |
| 2011/0273577 A1 | 11/2011 | Saito |

FOREIGN PATENT DOCUMENTS

| JP | 9-251342 | 9/1997 |
| JP | 2000-209483 | 7/2000 |
| JP | 2001-8087 | 1/2001 |
| JP | 2003-233817 | 8/2003 |

(Continued)

OTHER PUBLICATIONS

International Preliminary Report on Patentability mailed Jun. 28, 2012 issued in corresponding International Patent Application No. PCT/JP2009/007038.

(Continued)

*Primary Examiner* — Twyler Haskins
*Assistant Examiner* — Padma Haliyur
(74) *Attorney, Agent, or Firm* — Staas & Halsey LLP

(57) ABSTRACT

An image selection device includes: an image acquiring unit which acquires a plurality of shot images acquired by continuously shooting a subject; an area segmentation unit which segments an image area of the shot image into a motion area indicating different positions by a specified amount or more between two shot images and a non-motion area other than the motion area based on the two consecutive shot images in time series in the plurality of shot images; and a selection unit which selects at least one shot image from the plurality of shot images based on an amount of blur of an image in the non-motion area.

6 Claims, 19 Drawing Sheets

(56) References Cited

FOREIGN PATENT DOCUMENTS

| | | |
|---|---|---|
| JP | 2005-56388 | 3/2005 |
| JP | 2009-135561 | 6/2009 |
| JP | 2009-253848 | 10/2009 |
| WO | WO 2007/032156 | 3/2007 |
| WO | WO 2007/049634 | 5/2007 |
| WO | WO 2009/125733 | 10/2009 |

OTHER PUBLICATIONS

Written Opinion of the International Searching Authority mailed Mar. 23, 2010 (English Translation mailed Jul. 19, 2012) issued in corresponding International Patent Application No. PCT/JP2009/007038.

Jianbo Shi, Carlo Tomasi, "Good Features to Track", IEEE Conference on Computer Vision and pattern Recognition (CVPR94) Seattle, Jun. 1994.

International Search Report of Corresponding PCT Application PCT/JP2009/007038 mailed Mar. 23, 2010.

Japanese Office Action mailed Jul. 2, 2013 in corresponding Japanese Application No. 2011-545860.

Partial translation of JP 2000-209483.

* cited by examiner

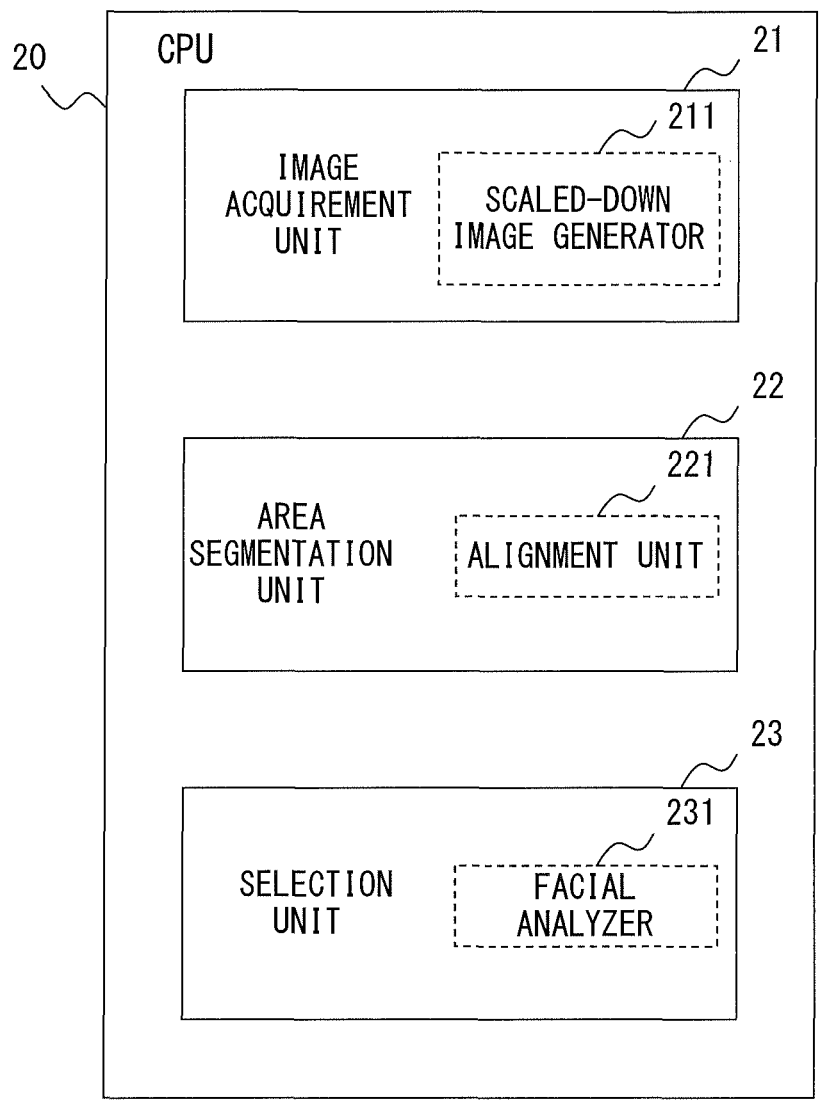
F I G. 3

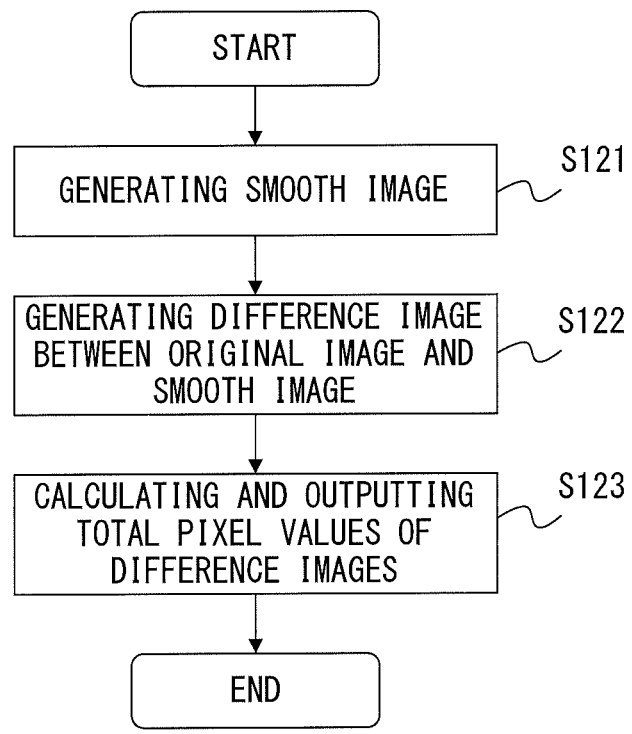
F I G. 7

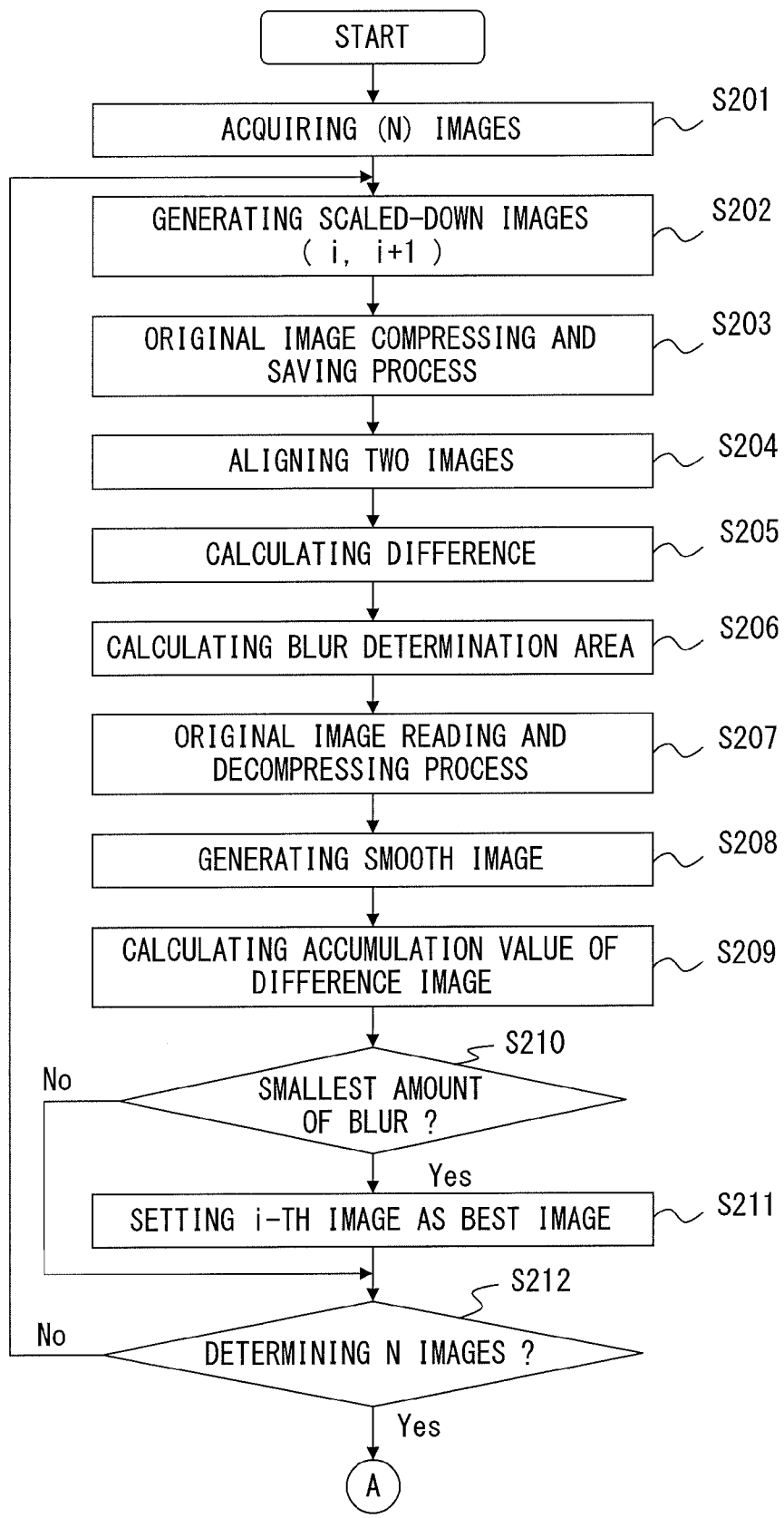
F I G. 1 2 A

IMAGE SELECTION DEVICE AND IMAGE SELECTING METHOD

CROSS-REFERENCE TO RELATED APPLICATIONS

This application is a continuation application based on International Application No. PCT/JP2009/007038, filed on Dec. 18, 2009, the entire contents of which are incorporated herein by reference.

FIELD

The embodiments discussed herein are related to image processing technology.

BACKGROUND

With the spread of digital camera (imaging device), the cost of taking a picture has been largely reduced, thereby widely spreading consecutive shooting. In the consecutive shooting, for example, several pictures are taken in one second.

One of the uses of consecutive shooting is the technology of performing consecutive shooting not to fail in shooting the best scene, and selecting and storing an image of good quality by a camera user etc. For example, the consecutive shooting is performed by changing for each shooting the shooting conditions such as an amount of exposure, a focusing position, an amount of flash light, etc. during shooting of each image, and a camera user selects an appropriate image from among a plurality of obtained images.

In addition, a technology of automatically selecting an image is well known instead of the camera user etc. manually selecting an image. With these technologies, to evaluate the quality of an image, the blur of an image caused by the camera shake during shooting and an inappropriate focus adjustment is checked, and an image with less blur is selected. Especially in an image of a small depth of field, there is the technology of avoiding the undervaluation of the quality of the image due to the blur of the background outside the area by evaluating the quality of the image only in the evaluation area partially provided in the image.

As another background technology, there is the technology of separating the image of the background from the image of a mobile object in a picture of the mobile object moving in front of the static background by considering the combination of the background image and the object image. In this technology, based on the correlation of the components of the images corresponding in a plurality of time-series screens, the boundary of the screen on which the components of the images discontinuously change in the direction of time is detected for each pixel. Then, it is determined whether or not the pixel value generated based on the components of the images on the screen of at least one of the front and back screens with respect to the detected boundary belongs to at least one of the foreground and the background.

In addition, there is a known technology of generating an image which looks like a portrait picture in which a main subject looks popped out by the intentional blur of the foreground or the background. In this technology, a shot image is sectioned into a first area and a second area as another area. Then, the blur level of the second area is detected, and the blur level of the second area is enhanced in proportion to the detected level, thus performing the blur emphasizing process.

Furthermore, there is the technology of generating an image without a position shift by a movement of a camera and a blurred subject by a movement of a subject. With a device for combining a plurality of images having the same imaging range in this technology, a position shift among a plurality of images having the same imaging range is detected, and the position shift of the images is corrected. Then, after the correction of the position shift, the similarity among the respective portions in the image is evaluated, and the image synthesizing method is changed depending on the evaluation of the similarity. In this technology, using a well known method called a KLT tracker (Kanade-Lucas-Tomasi Feature Tracker) method, a feature point is extracted from the image, and traced to detect the position shift of the entire image.

As another related technology, there is the technology of detecting a position checked by analyzing the line of sight of the eyes displayed on the image of a human face. Furthermore, there is the technology of detecting the image of the face of a human as a subject from a shot image, recognizing the facial expression by the image, and calculating the level of the smile on the facial expression.

The technologies described in the following documents are also known.

Document 1:
  Japanese Laid-open Patent Publication No. 2001-8087
Document 2:
  Japanese Laid-open Patent Publication No. 2000-209483
Document 3:
  Japanese Laid-open Patent Publication No. 2003-233817
Document 4:
  International Publication Pamphlet No. WO2007/049634
Document 5:
  International Publication Pamphlet No. WO2007/032156
Document 6:
  Japanese Laid-open Patent Publication No. H09-251342
Document 7:
  Japanese Laid-open Patent Publication No. 2005-056388
Document 8:
  Japanese Laid-open Patent Publication No. 2009-253848
Document 9:
  Jianbo Shi, Carlo Tomasi, "Good Features to Track", IEEE Conference on Computer Vision and pattern Recognition (CVPR94) Seattle, Jun, 1994

The blur of the image area of the main subject without the background can be caused by the movement of the subject itself other than by the camera shake during shooting and an inappropriate focus adjustment. The blur caused by the movement of the subject itself is not always limited to mis-shooting, but can be, for example, the expression of the speedy movement of a subject which is intended by the camera user. However, it is difficult to determine based on the image whether or not the blur caused in the image area of the subject is intended by the camera user.

SUMMARY

According to an aspect of the embodiment, an image selection device includes: an image acquirement unit which acquires a plurality of shot images acquired by continuously shooting a subject; an area segmentation unit which segments an image area of shot images into a motion area indicating different positions by a specified amount or more between two shot images and a non-motion area other than the motion area based on the two shot images consecutive in time series in the plurality of shot images; and a selection unit which selects at least one shot image from the plurality of shot images based on an amount of blur of an image in the non-motion area.

According to another aspect of the embodiment, an image selecting method includes: acquiring a plurality of shot images acquired by continuously shooting a subject; segmenting an image area of shot images into a motion area indicating different positions by a specified amount or more between two shot images and a non-motion area other than the motion area based on the two shot images consecutive in time series in the plurality of shot images; and selecting at least one shot image from the plurality of shot images based on an amount of blur of an image in the non-motion area.

According to yet another aspect of the embodiment, a computer-readable non-transitory recording medium stores a program used to direct a computer to select an image, wherein the program includes: acquiring a plurality of shot images acquired by continuously shooting a subject; segmenting an image area of shot images into a motion area indicating different positions by a specified amount or more between two shot images and a non-motion area other than the motion area based on the two shot images consecutive in time series in the plurality of shot images; and selecting at least one shot image from the plurality of shot images based on an amount of blur of an image in the non-motion area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram illustrated for various functions of a CPU 20 in FIG. 1.

FIG. 7 is a flowchart illustrated for the process contents of the blur amount calculating process.

FIG. 12A is a flowchart illustrated for the process contents of the second example (1) of the image selecting control process.

DESCRIPTION OF EMBODIMENTS

Preferred embodiments of the present invention will be explained with reference to accompanying drawings.

Figure 1:
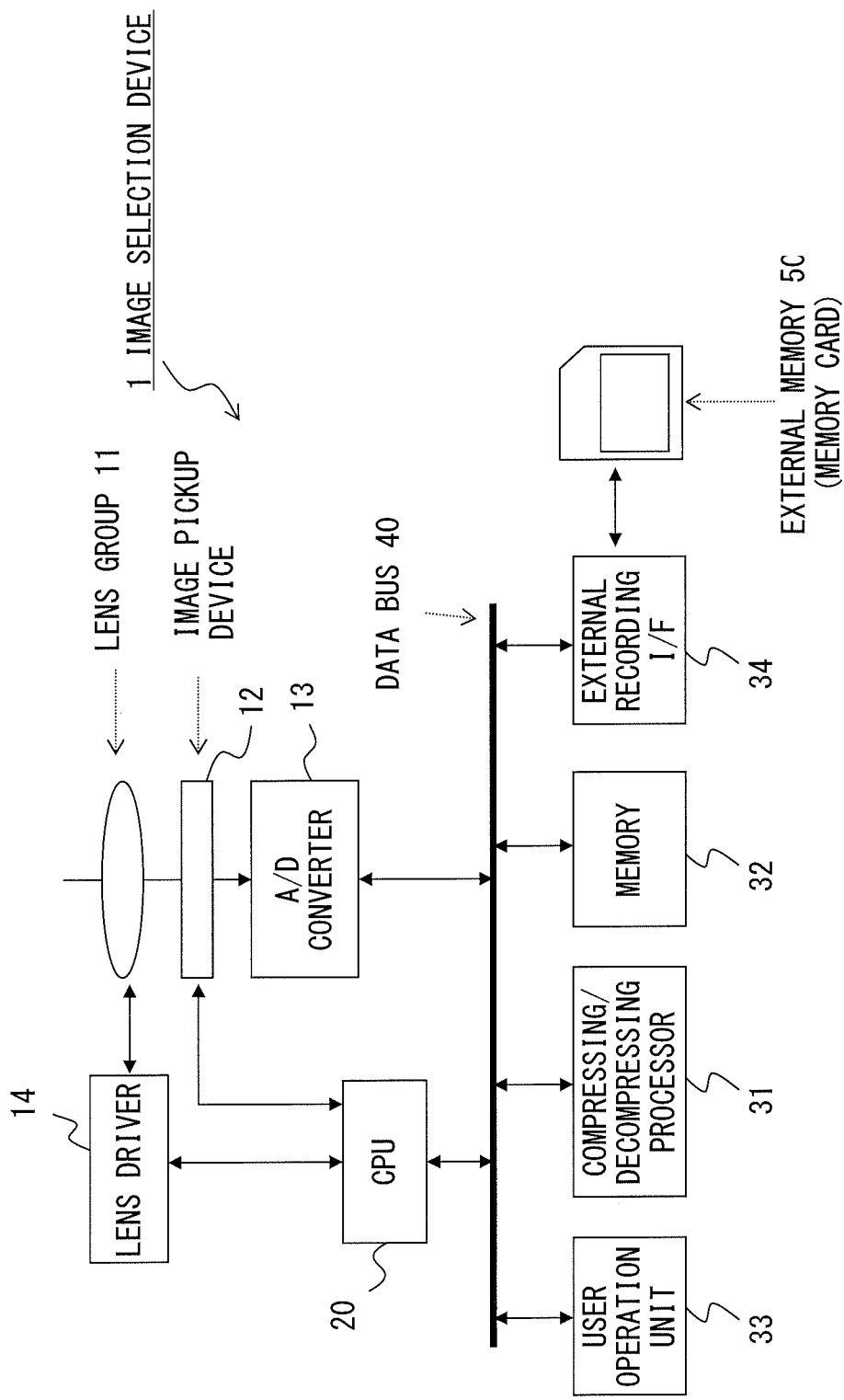
FIG. 1 is an example of the configuration of the image selection device.

Described first below is the block diagram in FIG. 1. FIG. 1 is an example of the configuration of the image selection device. An image selection device 1 has both the image selecting function of selecting an image having less influence by the camera shake during shooting as an image of high quality and the shooting function (function of a camera) including consecutive shooting.

The image selection device 1 includes a lens group 11, an image pickup device 12, an A/D converter 13, a lens driver 14, a CPU 20, a compressing/decompressing processor 31, memory 32, a user operation unit 33, and an external recording I/F 34.

The lens group 11 includes a plurality of optical lenses which form an optical image (subject image) of the subject on the photosensitive surface of the image pickup device 12 when the subject is shot using the function of a camera of the image selection device 1.

The image pickup device 12 performs a photoelectric conversion on the light received on the photosensitive surface under the control of the CPU 20, and outputs an electric signal expressing the image (shot image) of the subject image formed on the photosensitive surface.

The A/D converter 13 converts an electric signal output from the image pickup device 12 as an analog signal into digital data, and outputs the image data expressing a shot image.

The lens driver 14 moves the position of the optical lens configuring the lens group 11 under the control of the CPU 20 in the optical axis direction, thereby changing the focus of the subject image formed on the photosensitive surface of the image pickup device 12.

The CPU (central processing unit) 20 is a processor which controls the operation of the entire image selection device 1. The CPU 20, the A/D converter 13, the compressing/decompressing processor 31, the memory 32, the user operation unit 33, and the external recording I/F 34 are interconnected with one another through a data bus 40, and mutually communicate various types of data under the management of the CPU 20.

The compressing/decompressing processor 31 performs a compressing process and a decompressing process on image data. The compressing process is performed on the shot image expressed by the image data output from the A/D converter 13, and reduces the amount of data of the image data while maintaining the quality of the shot image as much as possible. The decompressing process is performed to acquire uncompressed image data (decompressed image data) expressing the image represented by the compressed image data from the image data after the compressing process (compressed image data).

The memory 32 includes ROM and RAM.

The ROM (read only memory) in the memory 32 is read only semiconductor memory storing in advance a specified basic control program, a specified image selecting control program, and various types of data for use in executing these control programs. The CPU 20 controls the operation of each component of the image selection device 1 by reading the basic control program from the ROM when the image selection device 1 is activated, and executing the program. Then, the CPU 20 provides various functions described later by further reading the image selecting control program from the ROM and executing the program. It is obvious that the flash EEPROM (electrically erasable programmable ROM) may be used as the ROM.

The RAM (random access memory) in the memory 32 is semiconductor memory readable and writable at any time which is used as a working storage area as necessary when the CPU 20 executes various control programs. The RAM is also used as a temporary holding area for the image data output from the A/D conversion unit 13, and further used as a working storage area when the compressing/decompressing process 31 performs the compressing process and the decompressing process on the image data.

The user operation unit 33 includes various switches operated by a user of the image selection device 1. When the switches are operated, the CPU 20 acquires various instructions (shooting instruction, consecutive shooting instruction, etc.) associated with the corresponding operation.

The external recording I/F (interface) 34 manages the communication of various data between various components connected to the data bus 40 and external memory 50 implemented for the image selection device 1. The external memory 50 is provided with, for example, flash EEPROM, and stores compressed image data.

Next, the image selecting function the image selection device 1 in FIG. 1 has is described with reference to an image example in FIG. 2.

Figure 2:
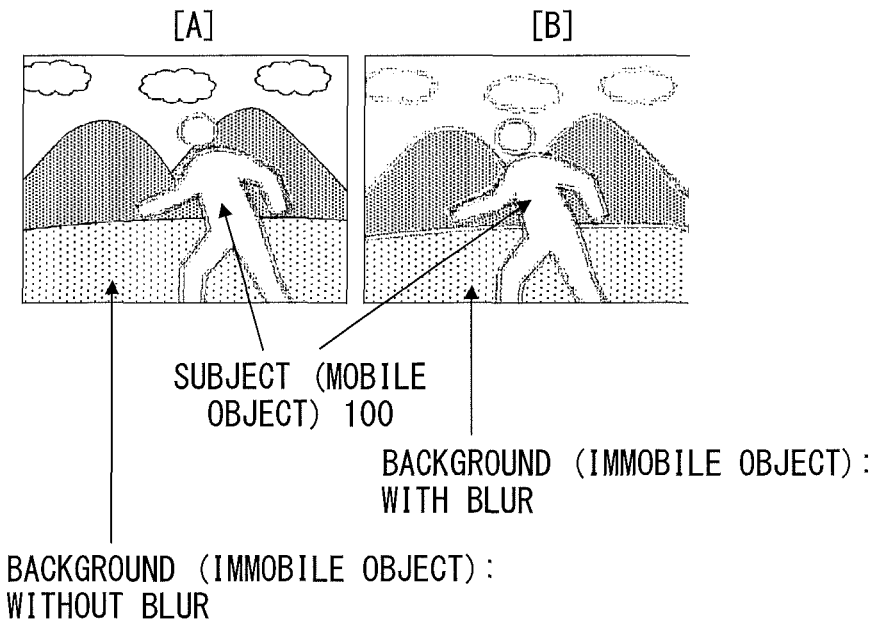
FIG. 2 is an example of the shot image acquired by consecutive shooting.

The image example in FIG. 2 refers to two shot images acquired by consecutive shooting of the image selection device 1. In the image [A], a subject 100 is blurred, but a background 200 is not blurred at all. However, in the image [B], both the subject 100 and the background 200 are blurred.

The image selection device 1 estimates that the blur of the image [A] has been caused by the movement of the subject 100 itself, and the blur of the image [B] has been caused by the camera shake during shooting and an inappropriate focus adjustment. That is, the image selection device 1 evaluates that the image [A] excels the image [B] in image quality, and selects the image [A] from the two images. The image selecting function of the image selection device 1 thus selects the image of good image quality from among the plurality of images acquired by consecutive shooting.

Described next are various functions provided by the CPU 20. FIG. 3 is a block diagram illustrated for various functions provided by the CPU 20.

The CPU 20 provides the functions of an image acquirement unit 21, an area segmentation unit 22, and a selection unit 23 by executing the above-mentioned image selecting control program.

The image acquirement unit 21 acquires a plurality of shot images acquired by continuously shooting a subject, and stores the images in the memory 32. The shot images are image data obtained by the A/D converter 13 converting the electric signal output by the image pickup device 12.

The area segmentation unit 22 segments the image areas of the two time-series shot images in a plurality of shot images stored in the memory 32 by the image acquirement unit 21 into a motion area and a non-motion area. The motion area refers to an area having positions different by a specified amount or more between the two shot images. A non-motion area refers to an area other than the motion area. In the image example in FIG. 2, the area in which the motion image of the subject 100 is displayed is a motion area, and the area in which the non-motion image (static image) of the background 200 is displayed is a non-motion area.

In the present embodiment, an alignment unit 221 is used to segment the image area of the shot image by the area segmentation unit 22. The alignment unit 221 aligns the above-mentioned two shot images. The area segmentation unit 22 segments the image area of the shot images into the motion area and the non-motion area based on the difference in pixel of a pair of pixels at the same position in the two shot images aligned by the alignment unit 221.

The selection unit 23 selects at least one shot image from a plurality of shot images acquired by the image acquirement unit 21 and stored in the memory 32 based on the amount of blur of the image in the non-motion area acquired by segmenting the image area of the shot image by the area segmentation unit 22.

In the present embodiment, the CPU 20 may provide the function as a scaled-down image generator 211 so that the image acquirement unit 21 uses the scaled-down image generator 211. The scaled-down image generator 211 generates a scaled-down image of the shot image acquired by the image acquirement unit 21 from the A/D converter 13. In this case, the image acquirement unit 21 stores the scaled-down image generated by the scaled-down image generator unit 211 in the memory 32. The area segmentation unit 22 segments the image area of the scaled-down image into a motion area and a non-motion area based on the above-mentioned two shot images. Then, the selection unit 23 selects the above-mentioned shot images based on the amount of blur of the image in the area of the shot image corresponding to the non-motion area acquired by the area segmentation unit 22 segmenting the image area of the scaled-down image. Thus, by the area segmentation unit 22 obtaining the scaled-down image of the image to be area-segmented, the computational complexity for the area segmentation cha be reduced, and the usage of the memory 32 for the process for the area segmentation is also reduced.

In the present embodiment, the CPU 20 provides the function as a facial analyzer 231 so that the selection unit 23 use the facial analyzer 231. The facial analyzer 231 analyzes the type of the image of the human face as a subject displayed on the shot image. The selection unit 23 uses the facial analyzer 231 when a plurality of the shot images are selected based on the amount of blur of the image in the non-motion area, and further selects at least one shot image from the plurality of selected shot images based on the analysis result by the facial analyzer 231. Thus, the image selection device 1 itself may further select images based on the type of human facial image as a subject.

Described next in detail is each function provided by the CPU 20.

Figure 4:
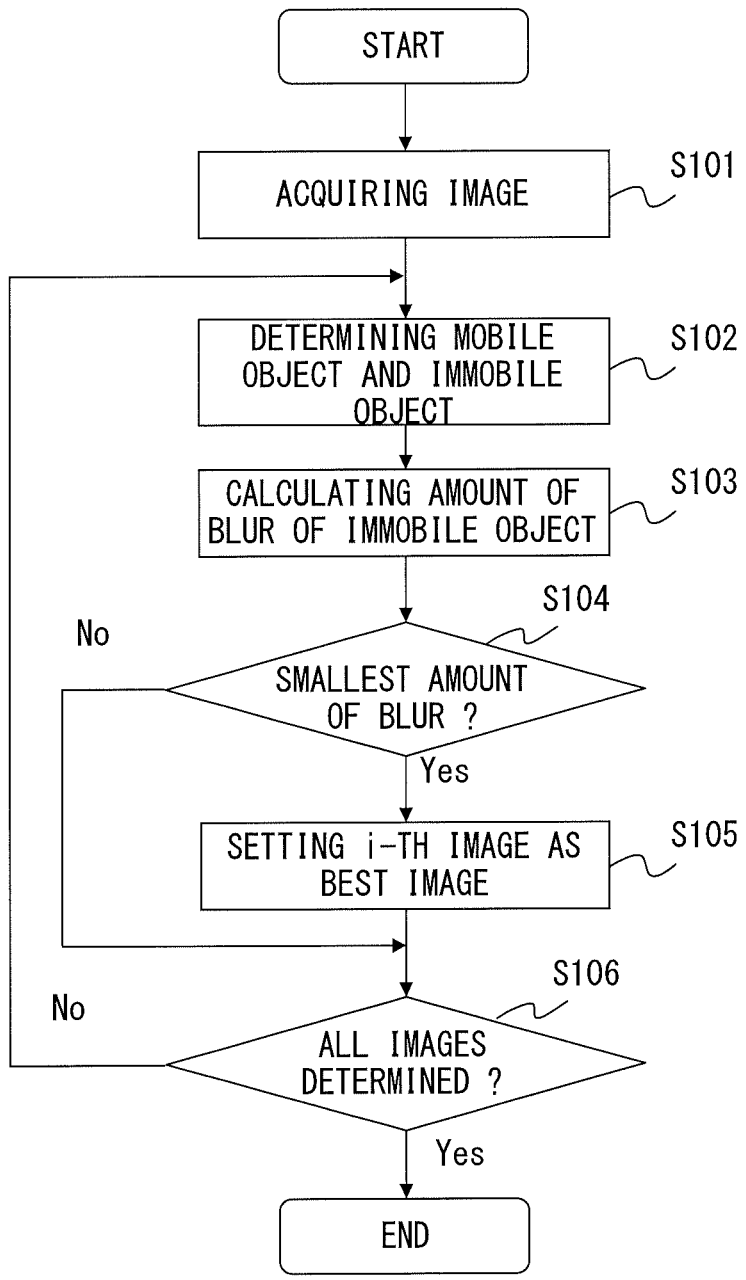
FIG. 4 is a flowchart illustrated for the process contents of the first example of the image selecting control process.

The flowchart in FIG. 4 is described first. FIG. 4 is a flowchart illustrated for the process contents of the first example of the image selecting control process.

The image selecting control process is performed by the CPU 20 when the image selection device 1 provides the image selecting function. The CPU 20 performs the process by executing the above-mentioned image selecting control program.

In FIG. 4, the image acquiring process is first performed in S101. The process is to acquire a plurality of shot images obtained by continuously shooting a subject from the image pickup device 12 through the A/D converter 13, and to store the images in the memory 32. The CPU 20 provides the function as the image acquirement unit 21 by performing the process.

Next, the mobile/immobile object determining process is performed in S102. The process is to determine the image area of two time-series consecutively shot images in the shot images stored in the memory 32 by the image acquiring process in S101 in the motion area displaying a mobile object and the non-motion area displaying an immobile object. The details of the process are described later. The CPU 20 provides the function as the area segmentation unit 22 by performing the process.

Next, the immobile object blur amount calculating process is performed in S103. The process is to calculate the amount of blur of the image of the non-motion area determined by the mobile/immobile object determining process in S102. In the subsequent determining process in S104, it is described whether or not the calculated amount of blur of the image in the non-motion area is the smallest in the calculated amounts of blur of the images in the non-motion area calculated from the shot images acquired in the image acquiring process in S101. When it is determined that the calculated amount of blur of the image in the non-motion area is the smallest in the calculated amounts (that is, when the determination result is YES), control is passed to S105. On the other hand, when it is determined that the amount is not the smallest (that is, when the determination result is NO), control is passed to S106. The details of the method of calculating the amount of blur of the image of the non-motion area are described later.

Next, in S105, the shot image i including the image of the non-motion area whose amount of blur is determined as the smallest is selected as the image having the best image quality, and then control is passed to S106.

The CPU 20 provides the function as the selection unit 23 for selecting a shot image based on the amount of blur of the image in the non-motion area by performing the processes in S103 through S105.

Next, in S106, it is determined whether or not the immobile object blur amount calculating process in S103 has been performed on all shot images acquired in the image acquiring process in S101. When it is determined that the immobile object blur amount calculating process has been performed on all shot images (that is, when the determination result is YES), the image selecting control process is terminated. On the other hand, when it is determined that there is a shot image on which the immobile object blur amount calculating process has not been performed (that is, when the determination result is NO), control is returned to S102, and the processes in and after S102 are performed again.

Figure 5:
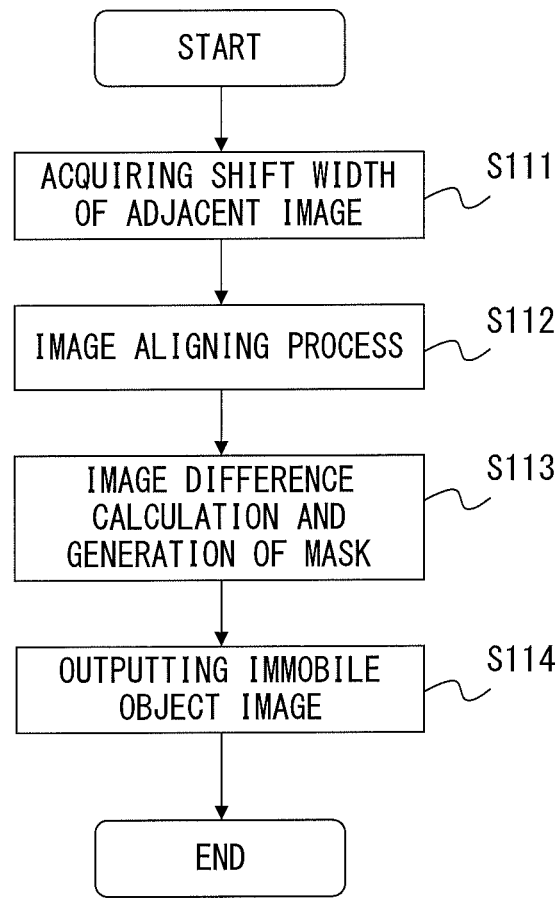
FIG. 5 is a flowchart illustrated for the process contents of the mobile/immobile object determining process.
Figure 6:
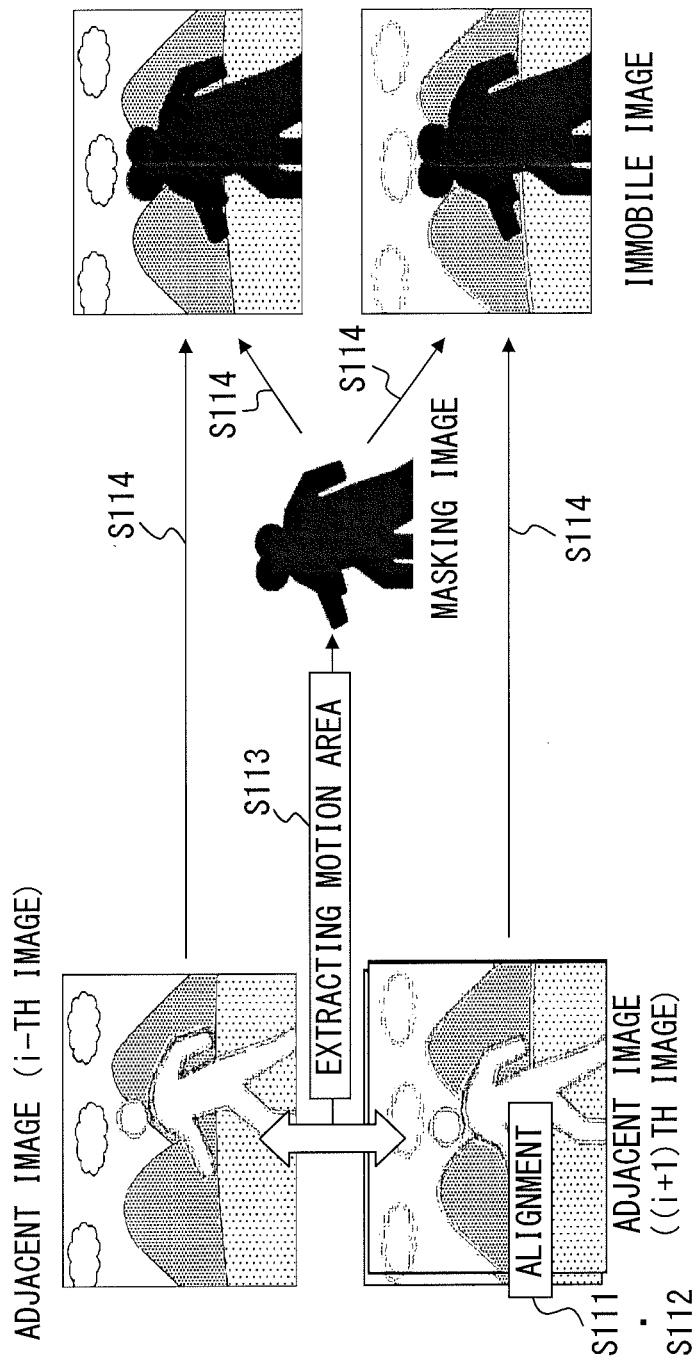
FIG. 6 is a schematic diagram of the images before and after performing each process configuring the mobile/immobile object determining process.

Described next with reference to FIGS. 5 and 6 are the details of the mobile/immobile object determining process as the process in S102 in FIG. 4. FIG. 5 is a flowchart illustrated for the process contents of the mobile/immobile object determining process. FIG. 6 is a schematic diagram of the images before and after performing each process configuring the mobile/immobile object determining process.

In FIG. 5, the adjacent image shift width acquiring process is first performed in S111. The process is to read the two shot images (adjacent images) consecutive in time series from among the shot images stored in the memory 32, and acquire the amount of position shift between the read image frames.

The amount of position shift between the image frames of the adjacent images is acquired as follows. That is, the area corresponding to the feature area extracted from one adjacent image is specified from the other adjacent image based on the similarity evaluation result (trace of the feature area), thereby acquiring the amount of movement of the feature area. Then, the calculation of the amount of movement is performed on each of a plurality of feature areas extracted from the shot images, and the average of the acquired amounts of movement is defined as the amount of position shift between the image frames of the adjacent images. The above-mentioned KLT tracker may be used in extracting and tracing the feature area.

Next, the image aligning process is performed in S112. In this process, the image frame of one of the adjacent images read from the memory 32 is moved based on the amount of position shift acquired in the adjacent image shift width acquiring process in S111, and the alignment is performed on the two adjacent images.

The CPU 20 provides the function as the alignment unit 221 by performing the processes in S111 and S112.

Next in S113, the image difference calculation and the mask generation process are performed. The process is to extract the motion area in the adjacent image based on the aligned adjacent images, and to generate a masking image to mask the motion area.

The extraction of a motion area is performed as follows, for example. That is, first, the difference in pixel value between a pair of target pixels at the same positions in the image frame in the adjacent images after the alignment is obtained on all pixels in the image frame. The image area configured by a set of target pixels whose absolute values of the obtained differences are equal to or exceed a specified threshold is extracted as a motion area. The specified threshold may be used as a unique value for each target pixel. For example, the specified threshold may be set based on the difference between the pixel value of the target pixel and the pixel value of the pixel adjacent to the target pixel in the same image.

Next, in S114, the immobile object image outputting process is performed. The process is to superpose the masking image on the adjacent image after the alignment, and to set the pixel value of the pixel in the motion area to "0", thereby obtaining an image of a non-motion area. When the process in S114 is completed, the mobile/immobile object determining process is terminated.

Next, the immobile object blur amount calculating process as the process in S103 in FIG. 4 is described with reference to FIG. 7. FIG. 7 is a flowchart illustrated for the process contents of the blur amount calculating process.

In FIG. 7, first in S121, the smooth image generating process is performed. The process is to smooth an image in a non-motion area on which the amount of blur is to be calculated. The smoothing process may be performed by, for example, realizing on all pixels configuring the images in the non-motion area the well-known process of obtaining as a pixel value of the target pixel an average value of the pixel values in a specified area centering the target pixel using an averaging filter. Obviously, other processes may realize the smoothing process. The image generated by the process (smooth image) indicates a smooth gray-scale change in the image, and the image of the non-motion area before the process is blurred.

Next, in S122, the difference (absolute value of the pixel values for each pixel of both images) between the smooth image obtained in the smooth image generating process in S121 and the image in the non-motion area before performing the process is used as the pixel value of the corresponding pixel, thereby generating a difference image.

Next, in S123, the total of the pixel values of respective pixels configuring the difference image obtained in the process in S122 is calculated, and the calculated total is output as the value indicating the small amount of blur of the image in the target non-motion area, and then the process in FIG. 7 is terminated.

Between the smooth image and the image in the non-motion area, the smaller the difference between the images is, the smaller the difference between the images becomes. On the other hand, the larger the difference between the images is, the larger the difference between the images becomes. As described above, since the smooth image is obtained by blurring the image in the non-motion area, the smaller the difference between the images is, the larger the amount of blur between the images in the non-motion area becomes. On the other hand, the larger the difference between the images is, the smaller the amount of blur of the image in the non-motion area becomes. Then, in the blur amount calculating process in FIG. 7, the total of the pixel values of the respective pixels configuring the difference image is calculated as a value indicating the small amount of blur of the image in the non-motion area. Therefore, in the image selecting control process in FIG. 4, the shot image as the extraction source of the image in the non-motion area having the largest total value of the pixel values of the respective pixels configuring a difference image obtained in the process in FIG. 7 is selected as the image of the best image quality.

By the CPU 20 performing each process in FIGS. 4, 5, and 7 described above, the image selection device in FIG. 1 selects an image of good image quality from among a plurality of images obtained by consecutive shooting. The image selection device 1 may output the selected image to the output unit connected to the image selection device. For example, to allow a user to confirm the contents of the shooting, a selected image may be displayed on the display as an example of the output unit. In addition, for example, the selected image may be stored in the memory 32 or the external memory 50 through the external recording I/F 34.

In the image selecting control process in FIG. 4, a plurality of images may be selected as the image of the best image quality by determining the same amount of blur for the images in the non-motion area. In this case, the selection unit 23 may further select the image of the best image quality from among the plurality of selected shot images.

Figure 8:
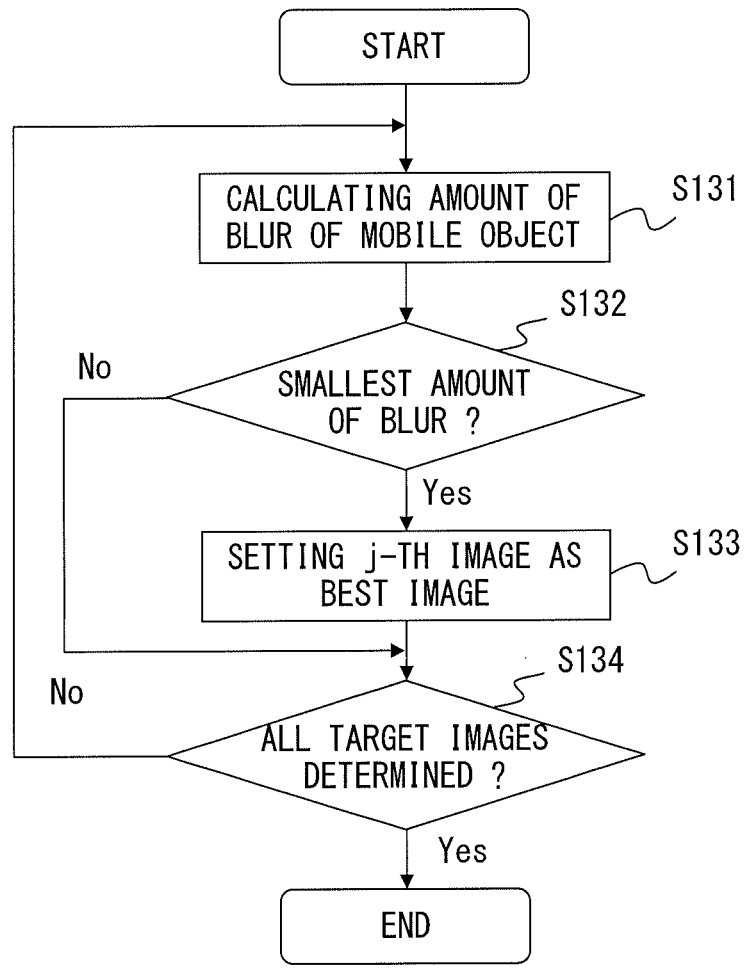
FIG. 8 is a flowchart illustrated for the process contents of the image secondary selecting control process.

Described below is the flowchart in FIG. 8. FIG. 8 is a flowchart illustrated for the process contents of the image secondary selecting control process. The process is to be performed by the CPU 20 when there is a plurality of shot images selected by the image selecting control process in FIG. 4. In this process, a shot image is further selected from among the plurality of shot images selected based on the amount of blur of the image in the non-motion area based on the amount of blur of the image in the motion area in the shot image.

In FIG. 8, first in S131, the mobile object blur amount calculating process is performed. The process is to calculate the amount of blur of the image of the motion area determined by the mobile/immobile object determining process in S102 in FIG. 4 on each shot image determined as having the same amount of blur of the image of the non-motion area. Then, in the determining process in the subsequent S132, it is determined whether or not the calculated amount of blur of the image in the motion area is the smallest in the amounts of blur of the images in the motion area calculated on each shot image having the same amount of blur of the image in the non-motion area. When it is determined that the calculated amount of blur of the image in the motion area is the smallest in the calculated amounts (that is, when the determination result is YES), control is passed to S133. On the other hand, when it is determined that the calculated amount is not the smallest (that is, when the determination result is NO), then control is passed to S134.

The calculation of the amount of blur of the image in the motion area may be performed like the calculation of the amount of blur of the image in a non-motion area. That is, the process target of the blur amount calculating process illustrated in FIG. 7 may be changed from a non-motion area image into a motion area image.

Next, in S133, the shot image j including the image in the motion area determined as having the smallest amount of blur is selected as an image having the best image quality, and then control is passed to S134.

Next, in S134, it is determined whether or not the mobile object blur amount determining process in S131 has been performed on all shot images determined as having the same amount of blur of the image in the non-motion area. When it is determined that the mobile object blur amount determining process has been performed on all shot images (that is, when the determination result is YES), the image secondary selecting control process is terminated. On the other hand, when it is determined that there still remains a shot image still on which the mobile object blur amount determining process has not been performed (that is, when determination result is NO), then control is returned to S131, and the processes in and after S131 is performed again on the remaining shot image.

By the CPU 20 performing the above-mentioned image secondary selecting control process, the image selection device in FIG. 1 further selects the shot image from among a plurality of shot images selected based on the amount of blur of the image in the non-motion area based on the amount of blur of the image in the motion area in the shot image.

Furthermore, in the image selecting control process in FIG. 4, the area segmentation to a motion area and a non-motion area of the image area, and the calculation of the amount of blur of a non-motion area have been performed on the entire shot image acquired from the image pickup device 12 by the image acquiring process in S101. Instead, a specified partial area in a shot image may be area segmented into a motion area and a non-motion area, and the shot image may be selected based on the calculation result of the amount of blur performed on the non-motion area.

Figure 9A:
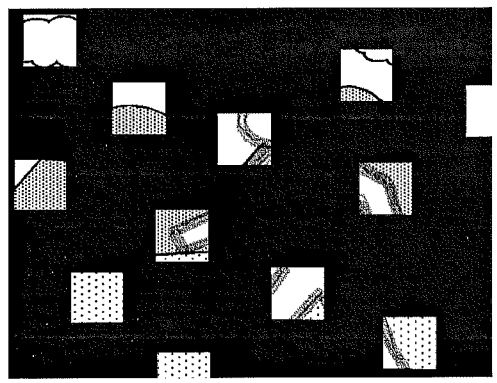
FIG. 9A is a setting example (1) of a partial area.
Figure 9B:
FIG. 9B is a setting example (2) of a partial area.

FIGS. 9A and 9B illustrate a setting example of a partial area. FIG. 9A is an example when a plurality of small areas not adjacent to one another are set as partial areas on a shot image. FIG. 9B is an example when a belt-shaped area spanning the left and right ends of an image frame in the shot image is set as a partial area on the shot image.

Since the target of a subsequent calculation of an amount of blur is a non-motion area in the shot image, the partial area is to be set on the shot image so that the non-motion area part in the shot image is captured. In the example in FIG. 9A, a number of small areas are set as scattering in the entire shot image, and a non-motion area (where the background is displayed) is captured in the partial area at a high probability. As illustrated in FIG. 9B, when the belt-shaped area spanning the left and right (or upper and lower) ends of the image frame on the shot image is set as a partial area, a non-motion area is captured at a high probability in the partial area.

The storage capacity required to hold in the memory 32 the image of a partial area in a shot image is obviously smaller than the storage capacity required to hold the entire shot image. Therefore, by setting a partial area as illustrated in FIGS. 9A and 9B, the storage capacity of the memory 32 is saved. In addition, the computational complexity of the CPU 20 required performing area segmentation on the partial area and calculation of the amount of blur is obviously reduced more than the case in which the entire shot image is processed.

Figure 10:
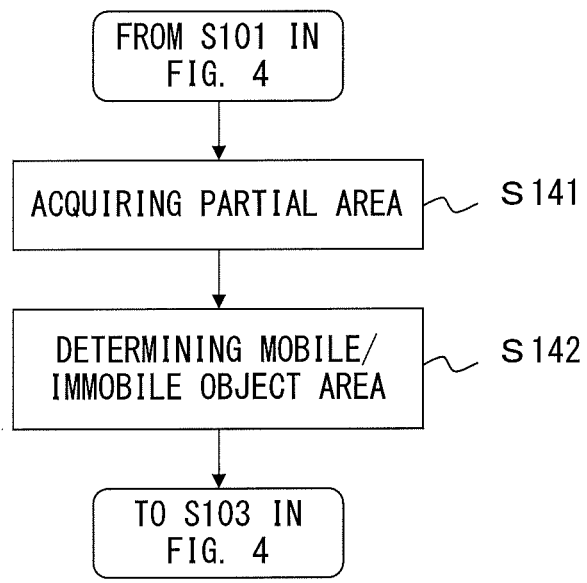
FIG. 10 is a flowchart illustrated for the first variation example of the first example of the image selecting control process in FIG. 4.

Described below is the flowchart in FIG. 10. FIG. 10 is a flowchart illustrated for the first variation example of the first example of the image selecting control process in FIG. 4.

The processes in S141 to S142 illustrated in FIG. 10 are performed by the CPU 20 instead of the process in S102 illustrated in FIG. 4.

When the shot image is acquired from the image pickup device 12 by the image acquiring process in S101 in FIG. 4, the partial area acquiring process is performed in S141 before the shot image is stored in the memory 32. The process is to extract and to acquire an image (partial area image) in a partial area whose position and size are preset from the shot image acquired from the image pickup device 12, and to store the acquired partial area image in the memory 32.

Next, the mobile/immobile object area determining process is performed. The process is to determine a motion area and a non-motion area in the image area of a partial area image. The process is performed on the partial area image by performing the process similar to the mobile/immobile object determining process illustrated in FIG. 5. Thus, the process of determining a motion area and a non-motion area of an image area is performed on the partial area image not on the entire shot image, thereby reducing the load of the process for the determination, and speedily performing the process as a result.

After completing the process above as illustrated in FIG. 10, the processes in and after S103 in FIG. 4 are performed.

By the CPU 20 performing the processes above in FIG. 10, the image area of a partial area image is determined as a motion area and a non-motion area, thereby selecting the shot image based on the amount of blur of the image in the non-motion area in the partial area image.

In the image selecting control process in FIG. 4, a motion area and a non-motion area of an image area are determined (area segmentation) using the shot image acquired in the image acquiring process in S101 from the image pickup device 12 in size as is. Instead, a scaled-down image of the shot image acquired from the image pickup device 12 is generated, the image area of the scaled-down image is determined as a motion area and a non-motion area, and the shot image is selected based on the amount of blur of the image in the area of the shot image corresponding to the non-motion area in the scaled-down image.

Figure 11:
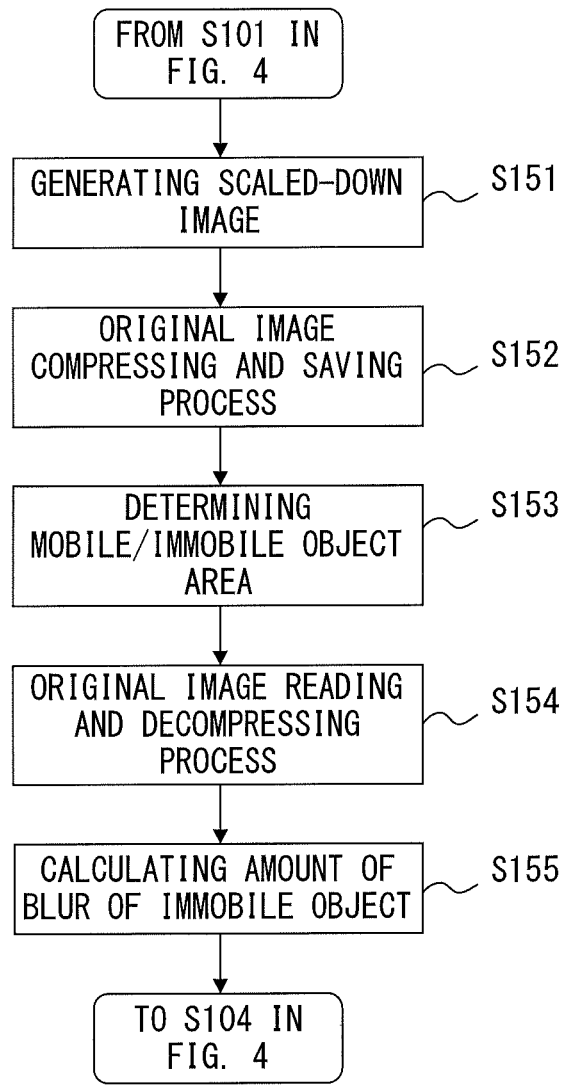
FIG. 11 is a flowchart illustrated for the second variation example of the first example of the image selecting control process in FIG. 4.

The flowchart in FIG. 11 is described below. FIG. 11 is a flowchart illustrated for the second variation example of the first example of the image selecting control process in FIG. 4.

The processes in S151 through S155 illustrated in FIG. 11 are performed by the CPU 20 instead of the processes in S102 and S103 in the processes in FIG. 4.

When the shot image is acquired from the image pickup device 12 in the image acquiring process in S101 in FIG. 4, the scaled-down image generating process is performed in S151 before the shot image is stored in the memory 32. The process is to generate a scaled-down image by performing the scaling down process for the size of the same scale-down rate for the vertical and horizontal value on the shot image acquired from the image pickup device 12, and to store the generated scaled-down image in the memory 32. The CPU 20 provides the function as the scaled-down image generation unit 211 by performing the process.

Next, the original image compressing and saving process is performed in S152. The process is to perform the compressing process by transferring to the compressing/decompressing processor 31 the original shot image (original image) on which the scaled-down image has been generated in the scaled-down image generating process in S151, to transfer the obtained compressed image data to the external recording I/F 34, and to store the obtained compressed data in the external memory 50. Thus, by holding the original image not in the memory 32 but in the external memory 50, the capacity of the memory 32 is saved.

Next, the mobile/immobile object area determining process is performed in S153. The process is to determine the image area of the scaled-down image as a motion area and a non-motion area based on the two scaled-down images consecutive in a time series in the scaled-down images stored in the memory 32 in the scaled-down image generating process in S151. The process may be performed by performing on the scaled-down image the process similar to the mobile/immobile object determining process illustrated in FIG. 5. Thus, by performing the process of determining a motion area and a non-motion area of the image area not on the original image, but on the scaled-down image, the load of the process for the determination is reduced, thereby speedily performing the process as a result.

Next, the original image reading and decompressing process is performed in S154. The process is to read the compressed image data of the original image of the scaled-down image determined for the image area in the mobile/immobile object area determining process in S153 from the external memory 50 through the external recording I/F 34, and to transfer the compressed image data to the compressing/decompressing processor 31 and perform the decompressing process on the compressed image data. In the shot image obtained by the decompressing process, the image area corresponding to the motion area and the non-motion area in the scaled-down image is defined as the motion area and the non-motion area in the shot image.

Next, the immobile object blur amount calculating process is performed in S155. The process is to calculate the amount of blur of the image in the non-motion area in the original image area segmented in the original image reading and decompressing process in S154. The process may be performed by performing the process similar to that illustrated in FIG. 7. Thus, by setting the original image as a target of the blur amount calculating process, the degradation in accuracy of the amount of blur caused by the scaled-down image set as a target of the calculation is suppressed.

After performing the above-mentioned process illustrated in FIG. 11, the processes in and after S104 in FIG. 4 are performed.

By the CPU 20 performing the above-mentioned process illustrated in FIG. 11, the image area of the scaled-down image generated from the shot image is determined as a motion area and a non-motion area, and the shot image is selected based on the amount of blur of the image in the area of the shot image corresponding to the non-motion area in the scaled-down image.

The process illustrated in FIG. 11 may also be combined with the process illustrated in FIG. 10 to select the shot image. Next, the image selecting control process obtained by combination with not only the processes above but also the image secondary selecting control process illustrated in FIG. 8 is described below with reference to FIGS. 12A and 12B.

Figure 12B:
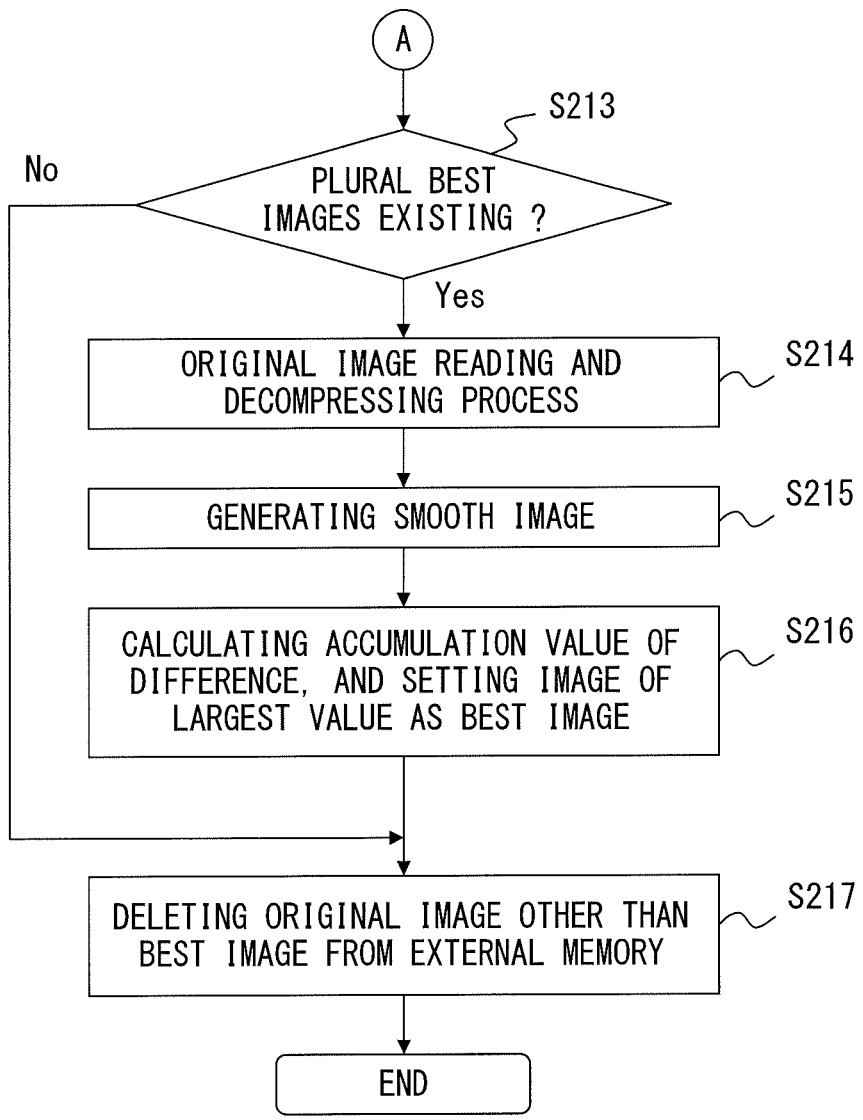
FIG. 12B is a flowchart illustrated for the process contents of the second example (2) of the image selecting control process.

FIGS. 12A and 12B are a flowchart illustrated for the process contents of the second example of the image selecting control process. The CPU 20 performs the process by executing the above-mentioned image selecting control program.

In FIG. 12A, the image acquiring process is first performed in S201. The process is to acquire N (plural) shot images obtained by continuously shooting a subject from the image pickup device 12 through the A/D converter 13.

Next, the scaled-down image generating process is performed in S202. The process is to generate a scaled-down image i+1 by performing the scaling down process at the same scaling rate for the vertical and horizontal values on the two shot images i and i+1 which are consecutive in a time series in the N shot images acquired from the image pickup device 12, and to store the generated shot images i and i+1 in the memory 32.

Next, the original image compressing and saving process is performed in S203. The process is to transfer the original shot image (original image) i used for generating the scaled-down image i to the compressing/decompressing process 31 to perform the compressing process, to transfer the obtained compressed image data to the external recording I/F 34, and to store the data in the external memory 50. Thus, by holding the original image in the external memory 50, not in the memory 32, the capacity of the memory 32 is saved.

Next, the aligning process between the scaled-down image i and the scaled-down image i+1 is performed in S204. In this process, the adjacent image shift width acquiring process in S111 and the image aligning process in S112 of the mobile/immobile object determining process in FIG. 5 are performed on the scaled-down images i and i+1.

Next, the difference calculating process is performed in S205. In this process, the image difference calculation and the mask generating process in the processes in S113 in the mobile/immobile object determining process in FIG. 5 are performed on the scaled-down images i and i+1, thereby generating the above-mentioned masking image on the scaled-down image i. Then, the generated masking image is superposed on the scaled-down image i to obtain the scaled-down image of the non-motion area.

Next, the blur determination area calculating process is performed in S206. In this process, the area (a target area on which the amount of blur is to be calculated) included in the partial area for which the position and the size are preset with respect to the scaled-down image is extracted from the scaled-down image i of the non-motion area. Then, the position and the size on the shot image i with respect to the area (hereafter referred to as a "corresponding area") corresponding to the area as the extracted non-motion area and the partial area are calculated based on the scale-down rate of the scaled-down image with respect to the original image.

Figure 13:
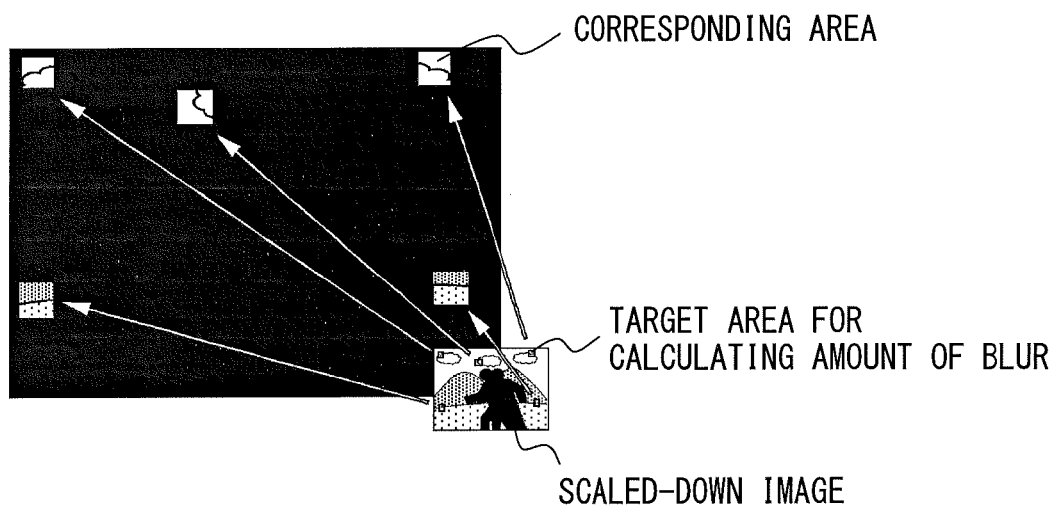
FIG. 13 is a schematic diagram of the relationship between the target area for calculation of the amount of blur in a scaled-down image and the corresponding area in the shot image.

The schematic diagram in FIG. 13 is described below. FIG. 13 is a schematic diagram of the relationship between the target area for calculation of the amount of blur in a scaled-down image and the corresponding area in the shot image. In the process in S206, the position and the size on the shot image of the corresponding area in the shot image are calculated from the corresponding area in the scaled-down image.

By the processes in S205 and S206, the position and size on the shot image i about the area corresponding to the motion area in the scaled-down image i and the partial area are similarly calculated.

Next, the original image reading and decompressing process is performed in S207. In this process, the compressed image data of the shot image i as an original image of the scaled-down image i is first read from the external memory 50 through the external recording I/F 34, and then transferred to the compressing/decompressing process 31 for the decompressing process. Then, the image (target image in calculating the amount of blur) of the area corresponding to the non-motion and partial area for which the position and size have been obtained in the blur determination area calculating process in S206 is acquired from the shot image i obtained in the decompressing process.

Next, the smooth image generating process is performed in S208. The process is to generate a smooth image by performing the smoothing process on the target image in calculating the amount of blur which has been acquired from the shot image i in the process in S207, and is similar to the process in S121 in the blur amount calculating process in FIG. 7.

Next, in S209, a difference image between the generated smooth image and the target image in calculating the amount of blur is generated, and the total of the pixel values of the respective pixels configuring the difference image is calculated as a value indicating the low level of the amount of blur of the target image. The process is similar to the processes in S122 and S123 in the blur amount calculating process in FIG. 7. That is, in the processes in S121 through S123, the process similar to the immobile object blur amount calculating process in S103 in FIG. 4 is performed.

Next, in S210, it is described whether or not the amount of blur of the target image calculated in the process in S209 and acquired from the shot image i is the smallest in the target image acquired from each shot image acquired in the image acquiring process in S201. The determining process is performed by determining whether or not the total about the target image calculated in the process in S209 and acquired from the shot image i is the largest in the target image acquired from each shot image acquired in the image acquiring process in S201. When it is determined that the calculated amount of blur is the smallest in the already calculated amounts (that is, when the determination result is YES), control is passed to S211. On the other hand, when it is determined that the amount is not the smallest (that is, when the determination result is NO), then control is passed to S212.

Next, in S211, the shot image i including the target image for which it is determined that the amount of blur is the smallest is selected as an image having the best image quality. Afterwards, control is passed to S212.

Next, in S212, it is determined whether or not the determining process in S210 has been performed on all shot images acquired in the image acquiring process in S201. When it is determined that the determining process has been performed on all shot images (that is, when the determination result is YES), control is passed to S213 in FIG. 12B. On the other hand, when it is determined that the determining process has not been performed (that is, when the determination result is NO), control is returned to S202, and the processes in and after S202 are performed again on the remaining shot images.

Next, in S213 of FIG. 12B, it is determined whether or not there are a plurality of shot images selected as an image having the best image quality by performing the process in S211 of FIG. 12A at plural times. When it is determined that there are a plurality of selected shot images (that is, when the determination result is YES), control is passed to S214. When it is determined that there are not plural selected shot images (that is, when the determination result is NO), then control is passed to S217.

The processes in S214 through S216 described below are to further select an image having the best image quality from among the plural selected and shot image in the process in S211 of FIG. 12A. In this example, the selecting process similar to the image secondary selecting control process in FIG. 8 is performed based on the amount of blur of the area of the shot image corresponding to the motion area in the scaled-down image and the partial area.

First, in S214, the original image reading and decompressing process is performed. In this process, the compressed image data of each shot image selected in the process in S211 is read from the external memory 50 through the external recording I/F 34, and the compressed image data is transferred to the compressing/decompressing processor 31 for the decompressing process. Then, the image (target image in calculating the amount of blur) of the area corresponding to the motion and partial area for which the position and size have been acquired in the blur determination area calculating process in S206 is acquired from the shot image obtained in the decompressing process.

Next, the smooth image generating process is performed in S215. The process is to generate a smooth image by performing the smoothing process on the target image in connecting the amount of blur which has been acquired from the shot image i in the process in S214, and is similar to the process in S212 in the blur amount calculating process in FIG. 7.

Next, in S216, a difference image between the generated smooth image and the target image in calculating the amount of blur is generated, and the total of the pixel values of the respective pixels configuring the difference image is calculated as a value indicating the low level of the amount of blur of the target image. Then, the image having the smallest vale of the amount of blur of the target image in the target images acquired from a plurality of shot images selected from the process in S211 (that is, the image having the largest total value) is selected as the best image.

Next, in S217, the compressed image data of the shot images other than the image selected as the best image is deleted from the external memory 50. Then, the process in FIGS. 12A and 12B terminates. The image whose compressed image data remains in the external memory 50 by the process is selected by the process in S216 when the determining process in S213 is YES. In case the determining process in S213 is NO, the image has been selected by the process in S211.

By the CPU 20 performing the process in FIGS. 12A and 12B, the image area of the partial area image of the scaled-down image generated from the shot image is determined as a motion area and a non-motion area, and the shot image is selected based on the amount of blur of the image in the area of the shot image corresponding to the non-motion area.

In the process in FIGS. 12A and 12B, an image having the best image quality has been further selected from a plurality of shot images temporarily selected in the process in S211 based on the amount of blur of the shot image corresponding to the motion and partial area in the scaled-down image. The further selection may also be performed based on other standards. Described below are some further selecting methods.

Figure 14:
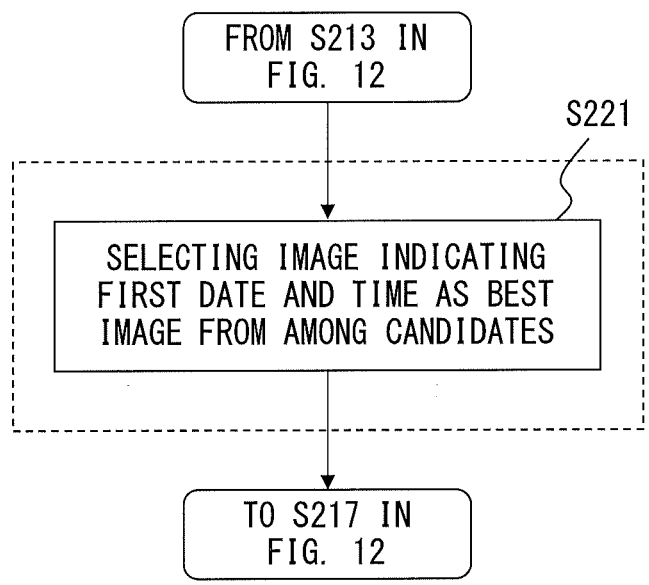
FIG. 14 is a flowchart illustrated for the first variation example of the second example of the image selecting control process in FIGS. 12A and 12B.

First described is the block diagram in FIG. 14. FIG. 14 is a flowchart illustrated for the first variation example of the second example of the image selecting control process in FIGS. 12A and 12B.

The process in FIG. 14 is to further select the shot image from the temporarily selected shot image based on the shooting order when the temporarily selected shot image is taken, and especially, the shot image taken on the first date and time.

The process in S221 illustrated in FIG. 14 is performed by the CPU 20 instead of the processes in S214 through S216 in the process in FIG. 12B.

In the determining process in S213 in FIG. 12B, if it is determined that there are a plurality of shot images selected in the process in S211 of FIG. 12A, the process in S221 is performed. In S221, the shooting date and time information added to the compressed image data of each shot image selected in the process in S211 is referred to, and the shot image whose first date and time corresponds to the compressed image data indicated by the shooting date and time information is selected as the best image.

After the process in S221, the process in S217 in FIG. 12B is performed, and the compressed image data of the shot images other than the image selected as the best image is deleted from the external memory 50, and then the process in FIGS. 12A and 12B is terminated.

By the CPU 20 performing the process above, a shot image is selected from a temporarily selected shot image based on the shooting order when the temporarily selected shot image is shot. In this process, since it is not necessary to perform the process of returning the compressed image data back to the original shot image by decompressing the compressed image data, there is less process load on the device.

In addition, a shot image may be further selected from the temporarily selected shot image based on, instead of performing the above-mentioned process, the analysis result of the type of a human facial image as a subject. Described below are some methods of further selecting a shot image based on the analysis result of the type of a human facial image.

Figure 15:
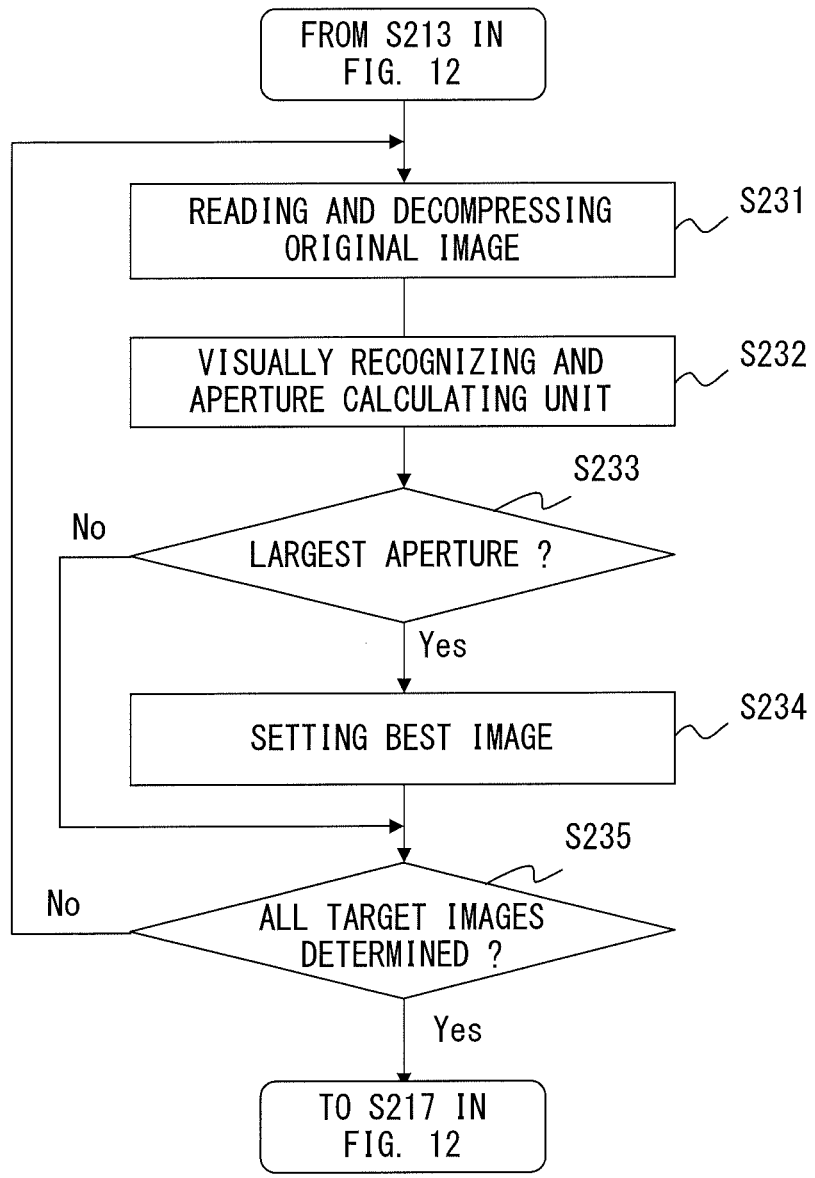
FIG. 15 is a flowchart illustrated for the second variation example of the second example of the image selecting control process in FIGS. 12A and 12B.

First, the flowchart in FIG. 15 is described below. FIG. 15 is a flowchart illustrated for the second variation example of the second example of the image selecting control process in FIGS. 12A and 12B.

The process in FIG. 15 is to analyze the type of the eyelids displayed on the image of a human face, to select a shot image including the image of an analyzed face on which the eyelids are open from among the temporarily selected shot images, and to remove in the selecting process the shot image including the face on which the eyelids are closed.

The processes in S231 through S235 illustrated in FIG. 15 are performed by the CPU 20 instead of the processes from S214 to S216 in the processes illustrated in FIG. 12B.

In the determining process in S213 in FIG. 12B, if it is determined that there are a plurality of shot images selected in the process in S211 of FIG. 12A, the process in S231 is performed. In S231, the original image reading and decompressing process is performed. In this process, the compressed image data of each shot image selected in the process in S211 is read from the external memory 50 through the external recording I/F 34, and transferred to the compressing/decompressing process 31 for the decompressing process so that the uncompressed shot image (original image) is acquired.

Next, in S232, the image area expressing the images of human eyes is recognized from the obtained original image, and the aperture of the eyelids displayed in the recognized image area is calculated. The technology of calculating the aperture of the eyelids in the facial image of a driver of a vehicle is well known. In this process, for example, the technology is used as is.

Next, in S233, it is determined whether or not the calculated aperture of the eyelids is the largest in the calculated apertures of for the respective selected shot images by the process in S211. When it is determined that the calculated aperture of the eyelids is the largest in the already calculated apertures (that is, when the determination result is YES), control is passed to S234. On the other hand, when it is determined that the calculated aperture is not the largest (that is, when the determination result is NO), control is passed to S235.

Next, in S234, the shot image including the image area for which it is determined that the aperture of the eyelid is the largest is selected as an image having the best image quality, and then control is passed to S235.

Next, in S235, it is determined whether or not the determining process in S233 has been performed on all shot images selected by the process in S211. When it is determined that the determining process has been performed on all shot images described above (that is, when the determination result is YES), the process in S217 in FIG. 12B is performed, and the compressed image data of the shot image other than the image selected as the best image is removed from the external memory 50. Afterwards, the process in FIGS. 12A and 12B is terminated. On the other hand, when it is determined that the shot image on which the determining process in S233 has not been performed (that is, when the determination result is NO), control is returned to S231, and the processes in and after S231 are performed again on the remaining shot images.

By the CPU 20 performing the processes above, the type of the eyelids displayed on the human face is analyzed, and a shot image is further selected from once selected shot image based on the analysis result of the amount of aperture of the eyelids.

Figure 16:
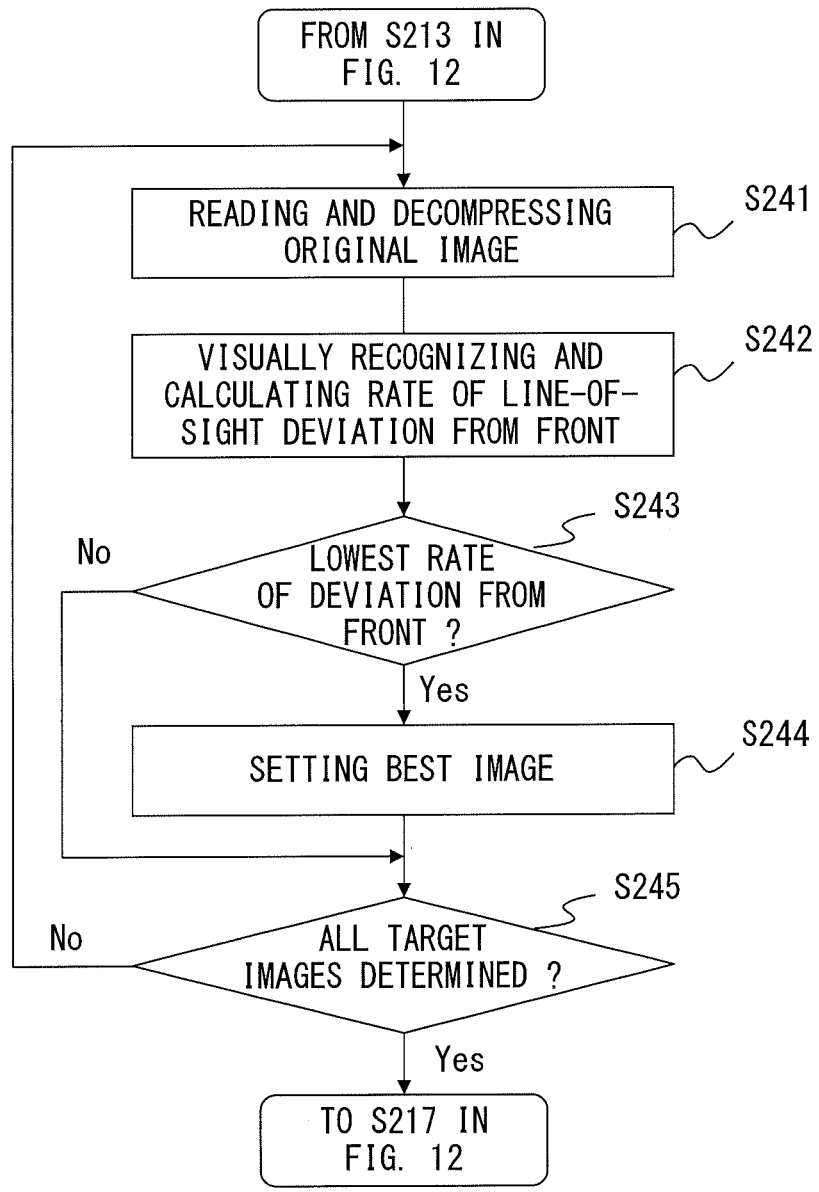
FIG. 16 is a flowchart illustrated for the third variation example of the second example of the image selecting control process in FIGS. 12A and 12B.

Described below is the flowchart in FIG. 16. FIG. 16 is a flowchart illustrated for the third variation example of the second example of the image selecting control process in FIGS. 12A and 12B.

The process in FIG. 16 is to analyze the line of sight displayed on the image of a human face, and select a shot image including the face on which the analysis indicates the line of sight as directed to the device which has taken the shot image from among the once selected shot images.

The processes in S241 through S245 illustrated in FIG. 16 are performed by the CPU 20 instead of the processes in S214 through S216 in the processes illustrated in FIG. 12B.

In the determining process in S213 in FIG. 12B, if it is determined that there are a plurality of shot images selected in the process in S211 of FIG. 12A, the process in S241 is performed. In S241, the original image reading and decompressing process is performed. The process is similar to the process in S231 in FIG. 15.

Next, in S242, the image area on which an image of a human eye is displayed is recognized from the obtained original image, and the rate of the deviation from the front of the line of sight of the eye displayed on the recognized image area is calculated. The technology of calculating the rate of the deviation from the front of the line of sight of the eye on the image of the face of the driver of a vehicle is widely known. In this process, for example, the technology is used as is.

Then, in S243, it is determined whether or not the calculated rate is the lowest (whether or not the line of sight indicates the lowest deviation rate from the front) in the rates already calculated on each shot image selected in the process in S211. When it is determined that the calculated rate indicates the lowest deviation rate (the line of sight indicates the lowest deviation rate from the front) in the already calculated rates (that is, when the determination result is YES), control is passed to S244. On the other hand, when it is determined that the calculated rate is not the lowest rate (that is, when the determination result is NO), then control is passed to S245.

Next, in S244, the shot image including the image area for which it is determined that the deviation rate of the line of sight from the front is the lowest is selected as an image having the best image quality, and control is passed to S245.

Next, in S245, it is determined whether or not the determining process in S243 has been performed on all shot images selected by the process in S211. When it is determined that the determining process has been performed on all shot images (that is, when the determination result is YES), then the process in S217 in FIG. 12B is performed, and the compressed image data of the shot images other than the image selected as the best image is removed from the external memory 50. Then, the process in FIGS. 12A and 12B is terminated. On the other hand, when it is determined that there are still shot images remaining on which the determining process has not been performed (that is, when the determination result is NO), control is returned to S241, and the processes in and after S241 are performed again on the remaining shot images.

By the CPU 20 performing the above-mentioned processes, the line of sight of the eyes displayed on the image of a human face is analyzed, and a shot image is further selected from among the once selected shot images based on the deviation rate of the line of sight from the front as an analysis result of the line of sight.

Figure 17:
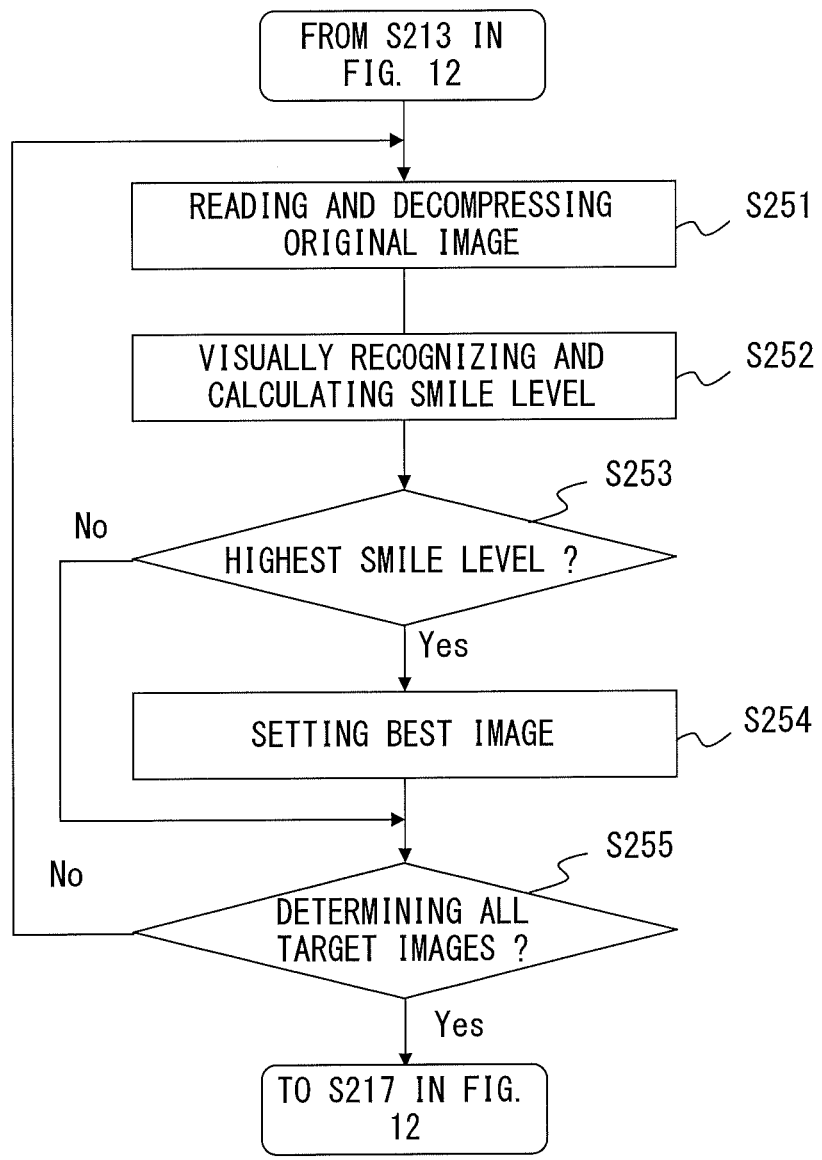
FIG. 17 is a flowchart illustrated for the fourth variation example of the second example of the image selecting control process in FIGS. 12A and 12B.

Described below is the flowchart in FIG. 17. FIG. 17 is a flowchart illustrated for the fourth variation example of the second example of the image selecting control process in FIGS. 12A and 12B.

The process in FIG. 17 is to calculate the level of smile by analyzing the facial expression displayed on the image of a human face, and select the shot image including the image of the face having the highest smile level from among the once selected shot images.

The processes from S251 through S255 illustrated in FIG. 17 are performed by the CPU 20 instead of the processes from S214 through S216 in the processes in FIG. 12B.

In the determining process in S213 in FIG. 12B, if it is determined that there are a plurality of shot images from which the shot image selected in the process in S211 of FIG. 12A is selected, then the process in S251 is performed. In S251, the original image reading and decompressing process is performed. The process is similar to the process in S231 in FIG. 15.

Next, in S252, the image area displaying the image of a human face is recognized from the obtained original image, and the smile level of the face displayed in the recognized image area is calculated. The technology of calculating the smile level of the face displayed in the shot image using a digital camera etc. is well known. In this process, for example, the technology is used as is.

Next, in S253, it is determined whether or not the calculated smile level is the highest in the smile levels already calculated on each shot image selected in the process in S211. When it is determined that the calculated smile level is the highest in the already calculated levels (that is, when the determination result is YES), then control is passed to S254. On the other hand, when it is determined that the level is not the highest (that is, when the determination result is NO), then control is passed to S255.

Then, in S254, the shot image including the image area whose smile level is the highest is selected as an image having the highest image quality, and then control is passed to S255.

Next, in S255, it is determined whether or not the determining process in S253 has been performed on all shot images selected in the process in S211. When it is determined that the determining process has been performed on all shot images (that is, when the determination result is YES), the process in S217 in FIG. 12B is performed, and the compressed image data of the shot image other than the image selected as the best image is removed from the external memory 50. Then, the process in FIGS. 12A and 12B is terminated. On the other hand, when it is determined that there are still shot images on which the determining process has not been performed (that is, when the determination result is NO), then control is returned to S251, and the processes in and after S251 are performed again on the remaining shot images.

By the CPU 20 performing the above-mentioned processes, the facial expression displayed on the image of a human face is analyzed, the smile level is calculated, and the shot image from the once selected shot image is further selected based on the smile level as an analysis result of the line of sight.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image selection device comprising:
   an image acquirement unit which acquires a plurality of shot images acquired by continuously shooting a subject;
   an area segmentation unit which segments a specified partial area constituted of a plurality of small areas, which are not adjacent to one another, in each of shot images into a motion area indicating different positions by a specified amount or more between two shot images and a non-motion area other than the motion area based on the two shot images consecutive in time series in the plurality of shot images; and
   a selection unit which selects at least one shot image from the plurality of shot images based on an amount of blur of an image in the non-motion area,
   wherein when a plurality of the shot images are selected based on a amount of blur of an image in the non-motion area, the selection unit further selects a shot image from the selected shot images based on the amount of blur in the motion area.

2. The device according to claim 1, further comprising:
   an alignment unit which aligns the two shot images, wherein
   the area segmentation unit segments the image area of the shot image into the motion area and the non-motion area based on a difference in pixel value of a pair of pixels in same positions between two shot images which the alignment unit has aligned.

3. The device according to claim 1, further comprising
   a scaled-down image generator which generates a scaled-down image of a shot image acquired by the image acquiring unit, wherein:
   the area segmentation unit segments the image area of the scaled-down image into the motion area and the non-motion area based on the scaled-down images of the two shot images; and
   the selection unit selects an image based on the amount of blur of the image in the area of the shot image corresponding to the non-motion area of the scaled-down image.

4. The device according to claim 1, further comprising
   an output unit which outputs an image selected by the selection unit.

5. An image selecting method comprising:
   acquiring a plurality of shot images acquired by continuously shooting a subject;
   segmenting a specified partial area constituted of a plurality of small areas, which are not adjacent to one another, in each of shot images into a motion area indicating different positions by a specified amount or more between two shot images and a non-motion area other than the motion area based on the two shot images consecutive in time series in the plurality of shot images; and
   selecting at least one shot image from the plurality of shot images based on an amount of blur of an image in the non-motion area,
   wherein when a plurality of the shot images are selected based on a amount of blur of an image in the non-motion area, the selection unit further selects a shot image from the selected shot images based on the amount of blur in the motion area.

6. A computer-readable non-transitory recording medium storing a program used to direct a computer to select an image, the program comprising:
   acquiring a plurality of shot images acquired by continuously shooting a subject;
   segmenting a specified partial area constituted of a plurality of small areas, which are not adjacent to one another, in each of shot images into a motion area indicating different positions by a specified amount or more between two shot images and a non-motion area other than the motion area based on the two shot images consecutive in time series in the plurality of shot images; and
   selecting at least one shot image from the plurality of shot images based on an amount of blur of an image in the non-motion area,
   wherein when a plurality of the shot images are selected based on a amount of blur of an image in the non-motion area, the selection unit further selects a shot image from the selected shot images based on the amount of blur in the motion area.

* * * * *